(12) United States Patent
Schröter et al.

(10) Patent No.: US 9,625,073 B2
(45) Date of Patent: Apr. 18, 2017

(54) JOINT UNIT AND JOINT ASSEMBLY COMPRISING SUCH A JOINT UNIT FOR NON-DETACHABLE CONNECTION OF MEDIA-CONVEYING LINES

(71) Applicant: Fränkische Industrial Pipes GmbH & Co. KG, Königsberg (DE)

(72) Inventors: Sören Schröter, Hallstadt (DE); Günter Bibinger, München (DE)

(73) Assignee: FRANKISCHE INDUSTRIAL PIPES (DE)

( * ) Notice: Subject to any disclaimer, the term of this patent is extended or adjusted under 35 U.S.C. 154(b) by 463 days.

(21) Appl. No.: 13/720,047

(22) Filed: Dec. 19, 2012

(65) Prior Publication Data

US 2013/0154258 A1 Jun. 20, 2013

(30) Foreign Application Priority Data

Dec. 20, 2011 (DE) .......... 10 2011 089 099

(51) Int. Cl.
*F16L 37/12* (2006.01)

(52) U.S. Cl.
CPC .................. *F16L 37/12* (2013.01)

(58) Field of Classification Search
CPC ..... F16L 37/12; F16L 37/1235; F16L 37/133; F16L 9/09
See application file for complete search history.

(56) References Cited

U.S. PATENT DOCUMENTS 3,873,062 A * 3/1975 Johnson et al. .......... 251/149.6
4,948,176 A * 8/1990 Bartholomew ............... 285/93
5,356,181 A  10/1994 Shirogane et al.
5,374,088 A  12/1994 Moretti et al.
5,934,713 A * 8/1999 Guest ........................ 285/322
6,199,913 B1 * 3/2001 Wang ........................... 285/24
6,318,764 B1  11/2001 Trede et al.
2008/0036206 A1 * 2/2008 Li-guo ....................... 285/322
2011/0121561 A1 * 5/2011 Wang ....................... 285/148.2

FOREIGN PATENT DOCUMENTS

| DE | 4334529 | 4/1994 |
| DE | 19722842 | 12/1998 |
| DE | 102007039368 | 2/2009 |
| DE | 102009056336 | 6/2011 |
| EP | 0566889 A1 | 10/1993 |
| EP | 0605801 | 7/1994 |
| EP | 2497991 A1 | 9/2012 |
| GB | CA 2405338 A1 * | 10/2001 .......... F16L 25/0045 |

OTHER PUBLICATIONS

German Patent Search Report dated May 8, 2012 in German Patent Application No. DE 10 2011 089 099.8.
German Patent Search Report dated Mar. 28, 2012 in German Patent Application No. DE 10 2011 089 100.5.

* cited by examiner

*Primary Examiner* — David E Sosnowski
*Assistant Examiner* — James Linford
(74) *Attorney, Agent, or Firm* — Plumsea Law Group, LLC (57) ABSTRACT

A joint unit is provided, including a main body, a bush, which is fastened to the main body in the axial direction and forms with the main body a receiving space intended to receive a connecting piece not forming part of the joint unit, and a retaining unit for interacting with the main body and the connecting piece. The bush and the retaining unit are formed together in one piece. A joint assembly is further provided, including a joint unit and a connecting piece.

21 Claims, 5 Drawing Sheets

JOINT UNIT AND JOINT ASSEMBLY COMPRISING SUCH A JOINT UNIT FOR NON-DETACHABLE CONNECTION OF MEDIA-CONVEYING LINES

CROSS REFERENCE TO RELATED APPLICATION

This application is based upon and claims the benefit of priority from prior German Patent Application No. 10 2011 089 099.8, filed Dec. 20, 2011, the entire contents of which are incorporated herein by reference.

The invention relates to a joint unit comprising a main body, which is configured and intended to be connected with a connecting piece not forming part of the joint unit, a bush, which, when the joint unit is assembled, is fastened to the main body in the axial direction relative to a longitudinal axis of the joint unit and forms with the main body a receiving space open towards one end of the main body, which space is intended to receive the connecting piece, and a retaining unit, which comprises a bearing surface directed opposite to the opening direction of the receiving space, which bearing surface is intended to interact with a mating bearing surface of the connecting piece directed in the opening direction, as well as to a joint assembly comprising such a joint unit, as used in particular in media-conveying line systems, for example in motor vehicle line systems.

It should be pointed out straight away that the indications "in the axial direction" and "in the radial direction" always relate to the longitudinal axis of the joint unit. As far as the "opening direction" of the receiving space is concerned, it should be pointed out that this extends in the opposite direction to the "insertion direction" of the connecting piece into the receiving space. In addition, the indication "fastened in the axial direction" means merely that the part in question cannot be withdrawn from the main body in the opening direction of the receiving space, but not necessarily that the two parts are fastened completely rigidly together in the axial direction.

Recently, there has been a greater requirement for the use of non-detachable joint assemblies, so as to be able to prevent undesired disassembly or attempts to manipulate the joint assemblies. This requirement is found in particular in the field of low-emission vehicles, and comes for example from the CARB approvals body (CARB—California Air Resources Board) for use in cars and motorcycles.

Such non-detachable joint assemblies and joint units are known per se. They comprise a number of components, at least some of their components, in particular the bush and/or the retaining unit, preferably being manufactured as plastics injection mouldings. Joining these components together to form the joint unit or the joint assembly is often a very complex procedure.

In this respect, it is the object of the invention to develop further a joint unit of the generic type in such a way as to achieve simplified production and simplified assembly of the components into the joint unit.

Said object is achieved according to the invention by a joint unit of the generic type in which the bush and the retaining unit are formed together in one piece, the retaining unit comprising a further bearing surface directed in the opening direction of the receiving space, which bearing surface is intended to interact with a further mating bearing surface of the main body directed opposite to the opening direction. The one-piece configuration of bush and retaining unit means first of all that one less component needs to be injection-moulded. The possibly somewhat higher costs for the injection mould are more than made up for by better use of the injection moulding installation, in particular by doing away with mould changeover. Furthermore, the assembly personnel have to carry out fewer operations to join together the individual components to form the joint unit, in particular because there is one component less to handle and to join together with the other components. Thus an assembly operative can assemble a greater number of joint units per unit time.

To be able reliably to ensure robust retention of the component comprising the bush and the retaining unit on the main body, it is proposed in a further development of the invention that the retaining unit comprise at least one retaining element with a contact portion, the contact portion being designed and dimensioned such that, when bush and main body are assembled, it is in contact over substantially its entire surface with the outer circumferential surface of the main body. This full-surface contact ensures that the component comprising the bush and the retaining unit is retained without play on the main body, such that in operation undesired relative motion cannot occur between said components which could impair functioning of the joint unit. Advantageously, at least two such retaining elements are provided, preferably diametrically opposite one another in the circumferential direction. In principle, however, it is also possible for more than two such retaining elements to be provided, for example three or four retaining elements.

The contact portion may for example comprise a main web curved concentrically relative to the longitudinal axis, which main web extends in the circumferential direction over a predetermined angular range and is connected adjacent its two ends, preferably at its two ends, to the bush via in each case one connecting web extending substantially in the axial direction. According to the above, the main direction of extension of the main web is the circumferential direction, while the main direction of extension of the connecting webs is the axial direction. This allows the connecting webs to provide the expandability of the at least one retaining element necessary for the bush to be slid and locked onto the main body.

If a contact surface of the connecting webs comprises a first surface portion arranged concentrically with the longitudinal axis and a second surface portion which flares radially away from the first surface portion, a force may in this way be generated as a result of the inherent resilience of the material of the retaining unit, through cooperation of the second surface portion with the outer circumferential surface of the main body, which force works to prevent the further bearing surface and the further mating bearing surface moving out of engagement.

To allow a locking connection of the joint unit with the connecting piece likewise belonging to the joint assembly, it is proposed that the at least one retaining element comprise a barb portion, which extends from the main web and flares radially away from the main web, the one bearing surface of the retaining unit preferably being formed on the free end of the barb portion.

In a further development of the invention, the further bearing surface of the retaining unit may be formed by an axial end face of the main web, which is arranged on the side of the main web remote from the connecting webs. This further development is advantageous especially when the barb portion extends from the main web, since then the forces may be transferred in substantially linear flow from the connecting piece into the barb portion and thence via the main web to the main body in the event of an attempt to pull the connecting piece back out of the receiving space. The substantially linear force flow results in a particularly robust configuration, such that the joint assembly is subject to virtually no risk of damage up to elevated forces exerted on the connecting piece.

As is known per se, the main body of the present invention may also comprise a circumferential groove for accommodating a sealing element, for example an O-ring. In a further development of the invention, it is proposed that the bush at most partially overlap the circumferential groove when fitted on the main body, preferably by less than 25% of the longitudinal extent of the circumferential groove in the axial direction. This makes it possible to insert the sealing element into the circumferential groove, during assembly of the joint unit, only when the bush, with the retaining unit formed in one piece thereon, has already been fitted on the main body. This prevents any risk of damage to the sealing element caused by fitting of the bush. In this context, the second surface portions, extending obliquely to the longitudinal axis of the joint unit, of the connecting webs, in cooperation with the associated mating surface of the main body, allow the assembly operative to withdraw the bush to such an extent, for the purpose of fitting the sealing element, that the entire circumferential groove is exposed for insertion of the sealing element.

In order to be able to prevent undesired manipulation of the at least one retaining element from outside, the bush may comprise an outer circumferential surface closed over its entire circumference.

As has already been indicated above, the invention further relates to a joint assembly comprising a joint unit of the above-discussed configuration and a connecting piece, the connecting piece comprising a mating bearing surface directed in the opening direction, which mating bearing surface is intended for retaining engagement with the bearing surface of the retaining unit directed opposite to the opening direction of the receiving space. The one mating bearing surface of the connecting piece may be formed of a defining face, extending orthogonally to the longitudinal axis of the joint unit or the joint assembly, of at least one window and/or at least one pocket in the connecting piece. Advantageously, the number of windows or pockets corresponds to that of the retaining elements of the retaining unit.

To be able to ensure that the at least one window or the at least one pocket meets with an associated retaining element on introduction of the connecting piece into the receiving space, i.e. to be able to ensure that the connecting piece is securely connected to the joint unit, provision may be made for at least one radial projection to be formed on the outer circumferential surface of the connecting piece or the inner circumferential surface of the bush, which projection interacts with a corresponding longitudinal groove on the respective other component, namely the bush or the connecting piece, on insertion of the connecting piece into the receiving space, so as to ensure predetermined relative positioning of these two components in the circumferential direction. The radial projection may here for example be formed of a longitudinal web.

In a further development of the invention, provision may further be made for the inner circumferential surface of the connecting piece to comprise a first portion of larger diameter and a second portion of smaller diameter, which are connected together via a conical portion. Through this configuration of the inner circumferential surface of a pipe portion of the connecting piece, it is possible to ensure that the sealing element only comes into contact with the connecting piece when the latter has already been guided in the bush, such that the contact takes place with the conical portion. In addition, the length of the first portion may be dimensioned such that the second portion only comes into engagement with the sealing element once the connecting piece has already been inserted into the receiving space. This may firstly reduce the risk of damage to the sealing element on insertion of the connecting piece into the receiving space. Secondly, the distance which the connecting piece has to travel between first contact with the sealing element and final locking together with the sealing unit against the force stemming from engagement with the sealing element, and thus the force that has to be applied by an assembly operative may be reduced. And thirdly, a leakage function may in this way be provided, by means of which it may be reliably established whether connection of joint unit and connecting piece has been properly produced.

It should also be added that the main body may be made of plastics, for example of polyamide, in particular as an injection moulding or by means of a corrugator as the end portion of a corrugated pipe. However, it may also be made of metal, for example of brass. The bush with the retaining unit formed in one piece thereon may preferably be made of plastics, in particular as an injection moulding.

The invention is explained in greater detail below by means of an exemplary embodiment and with reference to the appended drawings, in which.

Figure 1:
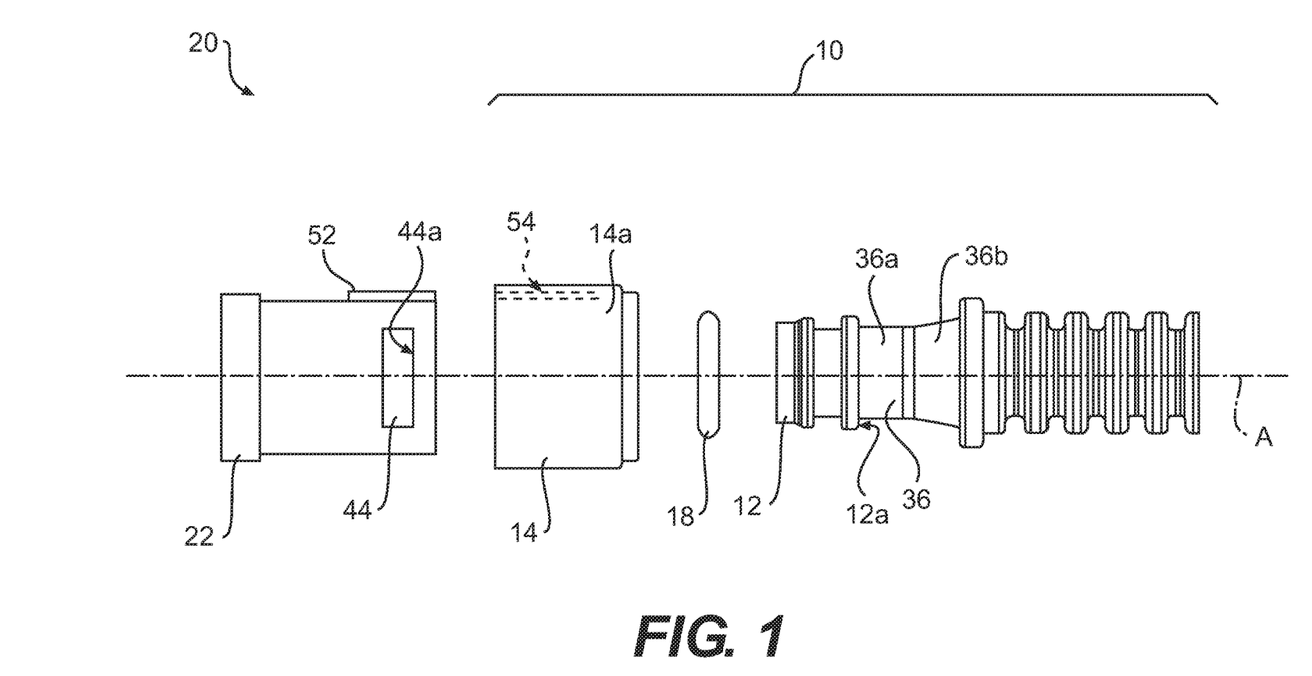
FIG. 1 is an exploded view of the joint unit or joint assembly according to the invention.

In FIG. 1 a joint unit according to the invention is designated in general as 10. It comprises a main body 12, a bush 14 and a sealing element 18 in the form of an O-ring. The joint unit 10 is configured and intended for sealing connection with a connecting piece 22, together with which it forms an joint assembly 20.

As shown in particular in FIGS. 3 to 7, the bush 14 is formed in one piece with a retaining unit 16, which serves to lock the bush 14 on the main body 12 and additionally to lock the connecting piece 22 in the joint unit 10.

The retaining unit 16 comprises two retaining elements 24, each of which comprises a contact portion 26 and a barb portion 28. The contact portion 26 is formed of a main web 30 curved concentrically relative to the longitudinal axis A of the bush 14 or the entire joint unit 10 and of two connecting webs 32 which connect the main web 30 to the bush 14. As is shown in the figures, the main web 30 extends substantially in the circumferential direction about the axis A, while the two connecting webs 32 extend substantially parallel to the axis A.

Figure 3:
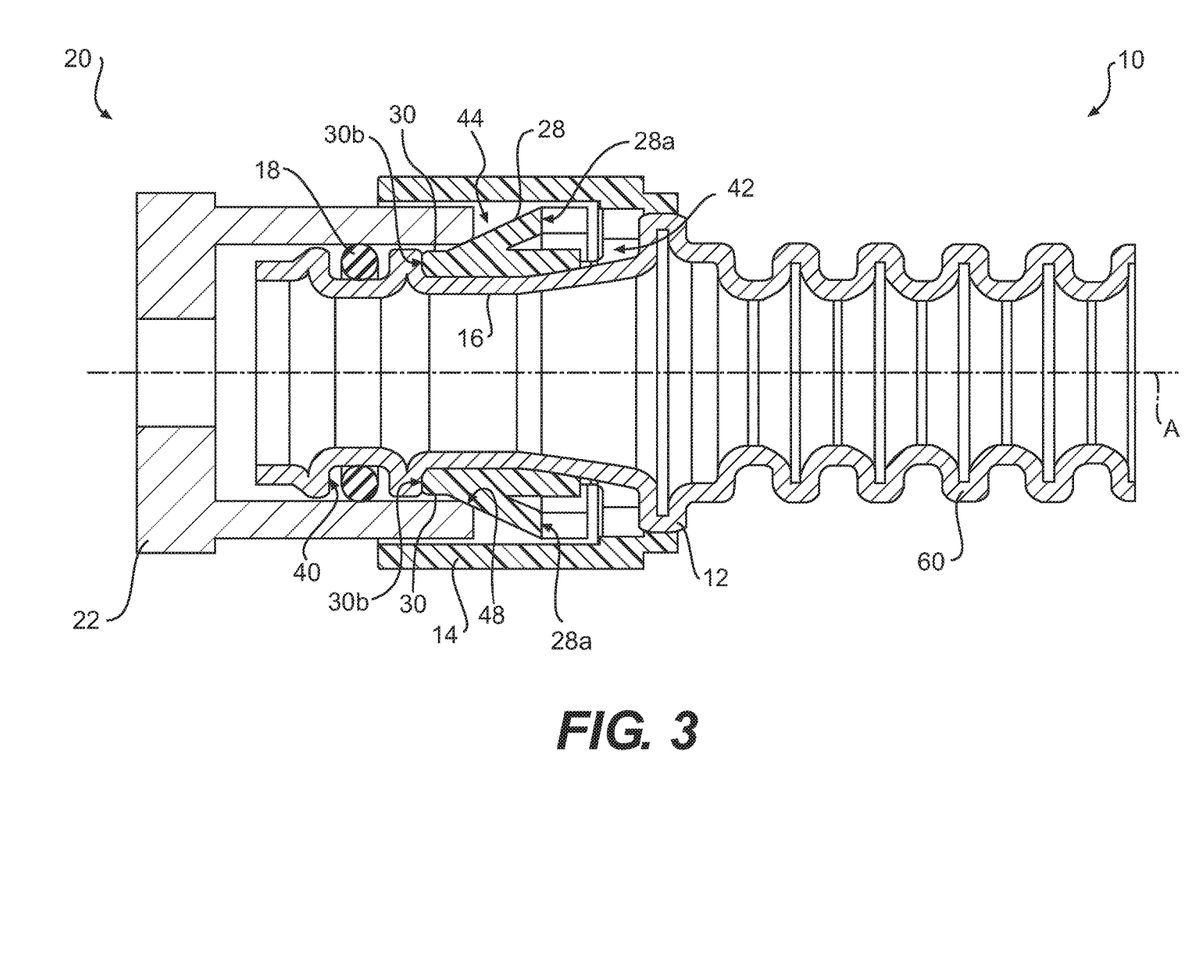
FIG. 3 shows a further longitudinal section through the joint unit or through the joint assembly according to FIG. 1, likewise with the joint assembly in the assembled state, the section plane extending orthogonally to the plane of the drawing of FIG. 1.
Figure 4:
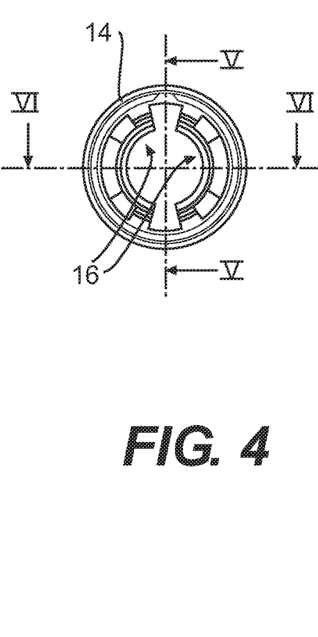
FIGS. 4 to 7 show various views of the bush according to the invention with integral retaining unit, with FIG. 4 specifically showing a cross-section, FIGS. 5 and 6 two longitudinal sections in different section planes, and FIG. 7 a perspective view.
Figure 5:
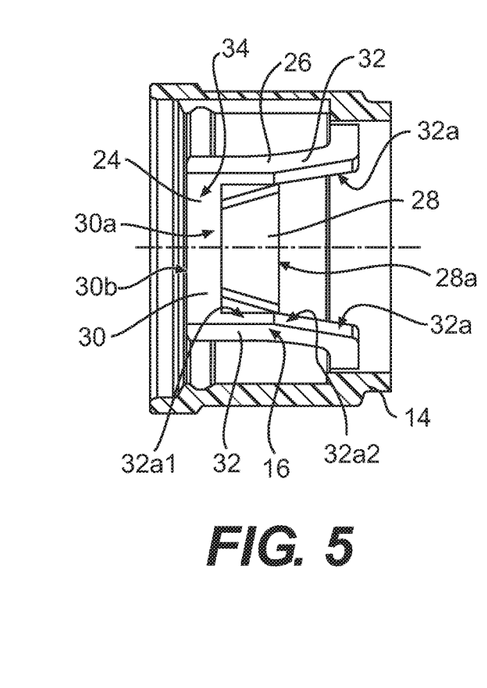
Figure 6:
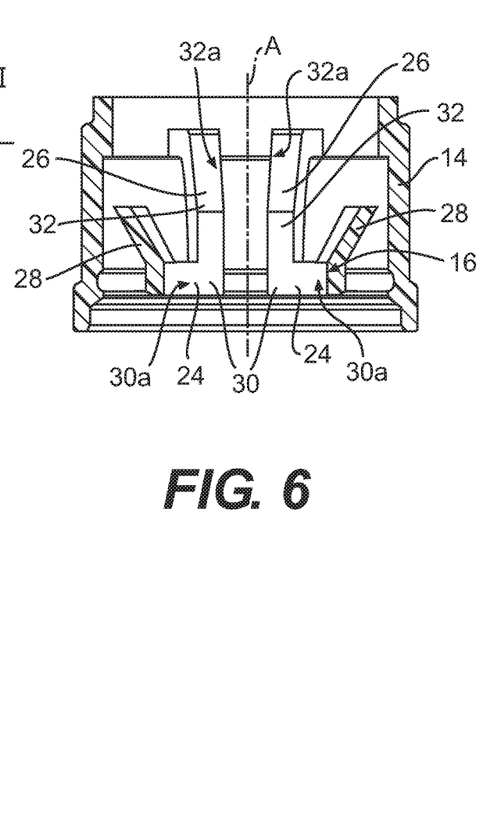
Figure 7:
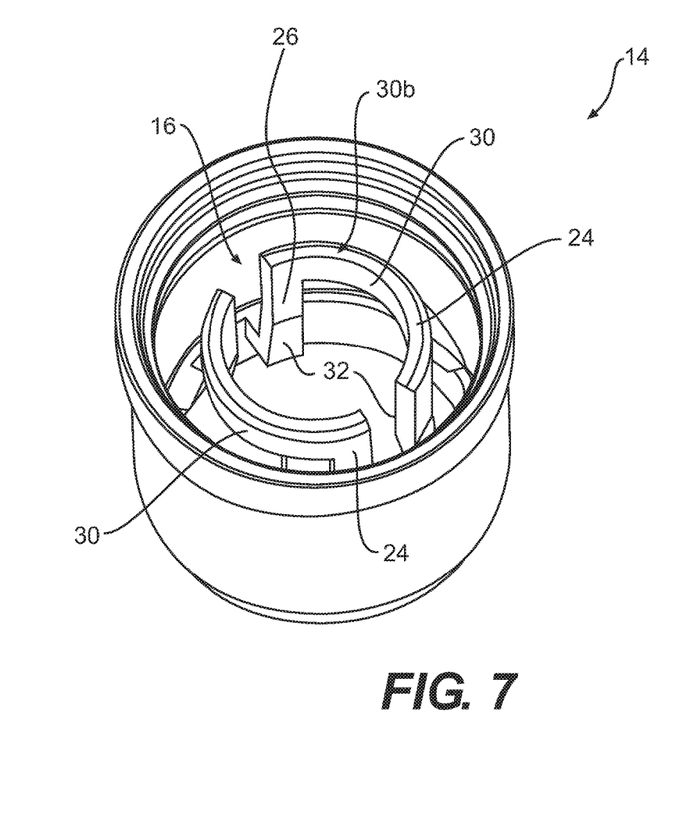

The radially inwardly directed surfaces 30a and 32a of the main web 30 and the connecting webs 32 together form a contact surface 34, with which the contact portion 26 rests with its entire surface against an associated surface portion 36 of the outer circumferential surface of the main body 12 when the bush 14 is fitted on the main body 12 (see FIG. 3).

As shown in FIGS. 1 and 3, the surface portion 36 of the main body 12 is composed of a substantially circular-cylindrical portion 36a and a conically widening portion 36b. Corresponding to this, the inner surface 32a of the connecting webs 32 is composed of a portion 32a1 extending substantially concentrically with the axis A and a conically widening portion 32a2 (see FIG. 5).

When the bush 14 is slid onto the main body 12, the surface portions 32a2 serve as leading ramps for the main body 12. The main webs 30 of the retaining elements 24 may yield radially outwards as a result of flexibility inherent in the material of the connecting webs 32 and so allow the bush 14 to be slid further onto the main body 12. Once the bush 14 has reached the position relative to the main body 12 illustrated in FIGS. 2 and 3, the deformed connecting webs 32 are able to relax again, such that the retaining elements 24 are applied with their contact surface 34 form-fittingly against the surface portion 36 of the main body 12.

Figure 2:
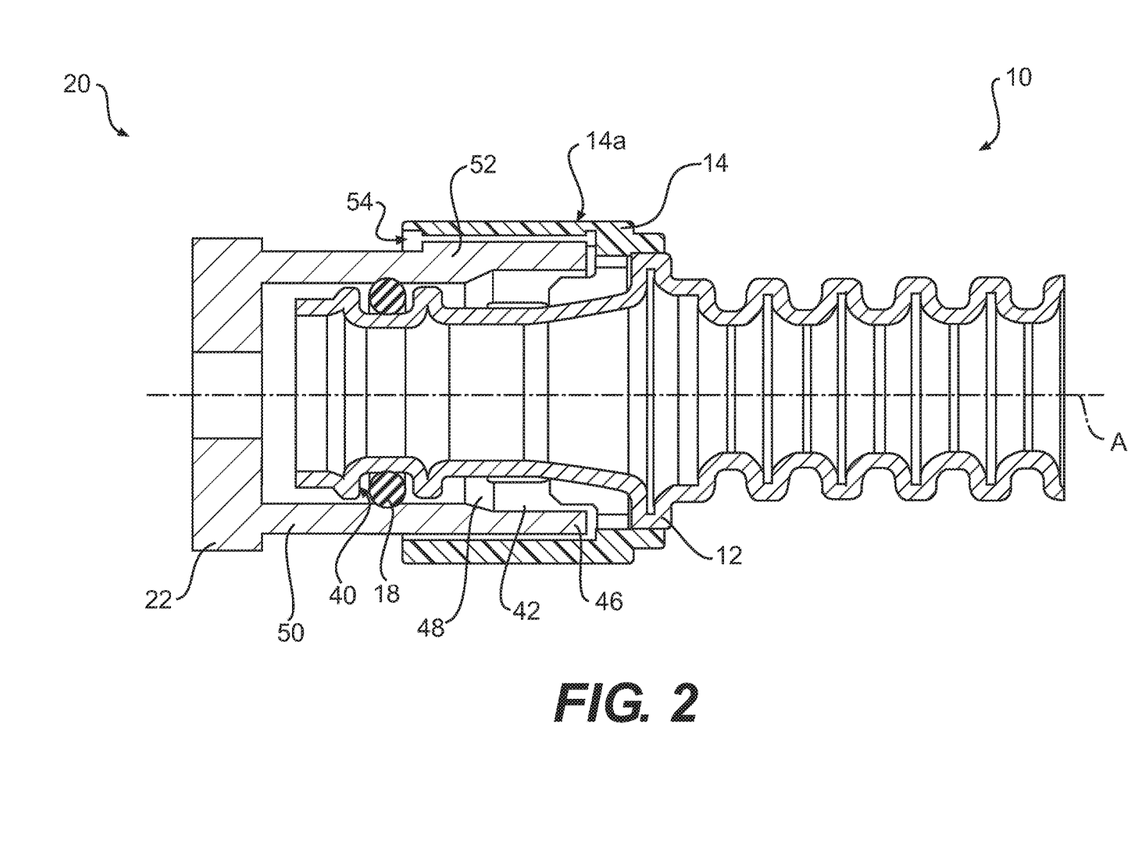
FIG. 2 shows a longitudinal section through the joint unit or through the joint assembly according to FIG. 1 with the joint assembly in the assembled state, the section plane corresponding to the plane of the drawing of FIG. 1.

As is further visible from FIGS. 2 and 3, in this preassembled state of main body 12 and bush 14, a circumferential groove 40 in the main body 12, which serves to accommodate the sealing element 18, is substantially completely outside the bush 14. In any case, the circumferential groove 40 is overlapped so slightly by the bush 14 that the bush 14 can still be withdrawn far enough, to insert the sealing element 18 into the circumferential groove 40, for the circumferential groove 40 to be completely freely accessible, i.e. no longer overlapped by the bush 14. In the course of this withdrawal, the connecting webs 32 run with their inner surface portions 32a over the conically widening surface portion 36b of the main body 12, resulting in a restoring force which tends to return the bush 14 to the position shown in FIGS. 2 and 3.

In the assembled state of the joint unit 10 brought about in this way, the main body 12 and the bush 14 form between them a receiving space 42, which serves to receive the connecting piece 22.

As shown in FIGS. 1 and 3, the connecting piece 22 has two windows 44, which are intended to interact with the barb portions 28 of the retaining elements 24. At its free end, on the right in FIG. 2, the connecting piece 22 has a pipe portion 46 of larger internal diameter, which develops away from the free end via a conical portion 48 into a pipe portion 50 of smaller diameter. The windows 44 are located at the point of transition between the pipe portion 46 of larger internal diameter and the conical portion 48. On insertion of the connecting piece 22 into the receiving space 42, the connecting piece 22 with the pipe portion 46 of larger internal diameter runs up against the barb portions 28 of the retaining elements 24 and presses them radially inwards. The internal diameter of the pipe portion 46 is here dimensioned such that the barb portions 28 have sufficient space to give. Once the windows 44 arrive at a longitudinal portion of the bush 14 in which are located the barb portions 28 of the retaining elements 24, the barb portions 28 may expand radially outwards again, moving into the windows 44. This position is shown in FIG. 3. It corresponds to the final assembled position of the joint assembly 20.

If an attempt is made, from this position, to pull the connecting piece 22 back out of the receiving space 42, an axial end face 44a of the connecting piece 22, which is part of the surface defining the window 44, comes to rest against an axial end face 28a at the free end of the barb portions 28. The surface 28a here forms the bearing surface for the purposes of this invention, while the surface 44a forms the mating bearing surface for the purposes of the invention. As a result of the surfaces 44a and 28a bearing against one another in this way, the retaining elements 24 are pressed with an axial end face 30b of the main webs 30 to rest axially against an axial surface 12a of the main body 12. The surface 30a here forms the further bearing surface for the purposes of the invention, while the surface area 12a forms the further mating bearing surface for the purposes of the invention.

As a result of this configuration, connection of the connecting piece 22 to the bush 14 through the intermediary of the retaining unit 16 formed in one piece with the bush 14 can only be undone again by damaging these components. The same is also true of disassembly of the bush 14 from the main body 12. At this point it should therefore be pointed out that the term "non-detachably" should be understood in the context of the present invention to mean that the connecting piece 22 can only be removed again from the joint unit 10 or the bush 14 from the main body 12 by damaging these components. As a result of this damage, undesired manipulation of the joint unit 10 or the joint assembly 20 can be readily detected. The connecting piece can no longer be detached from the joint unit 10 or the bush 14 from the main body 12 without damage.

Said non-detachability also means structurally that the outer circumferential surface 14a of the bush 14 is of closed configuration over its entire circumference. This measure prevents the possibility of acting from outside on the retaining unit 16 with any type of tool in order to undo engagement thereof with the bush 14 and/or the connecting piece 22.

In order to be able to ensure that the connecting piece 22 is brought up to the joint unit 10, in a relative orientation to the joint unit 10, in particular to the bush 14, in which the windows 44 are located at a circumferential position which corresponds to the circumferential position of the barb portions 28, a guide web 52 is formed on the outer circumferential surface of the connecting piece 22 (see FIG. 2), which guide web 52 engages in a guide groove 54 in the bush 14 on insertion of the connecting piece 22 into the bush 14.

It should also be added that the conical surface portion 48 rests externally against the barb portions 28 of the retaining elements 24 when the joint assembly 20 is in the assembled state and thus supports them if an attempt is made to pull the connecting piece 22 back out of the receiving space 42, so stabilising them against undesired deformation.

It should additionally be added that the configuration of the inner surface of the connecting piece 22, with the portion 46 of larger internal diameter, the conical portion 48 and the portion 50 of smaller internal diameter, means that the sealing element 18 does not immediately come into contact with the connecting piece 22 on insertion of the connecting piece into the receiving space 42, but rather only in the region of the surface portion 50 of smaller internal diameter. In this way, the sealing element 18 only develops its sealing action shortly before the barb portions 28 are locked into the windows 44. Thus, if the connection of joint unit 10 and connecting piece 22 is not properly produced, this is indicated by leakage of the joint assembly 20.

It should finally also be added that in the exemplary embodiment shown the main body 12 takes the form of an end portion of a corrugated pipe 60, i.e. may be manufactured at the same time as production of the corrugated pipe 60 in a corrugator. It is in principle however also possible to produce the main body 12 as a separate injection moulding, which is then connected with the corrugated pipe or a plain pipe. It is also feasible to produce the main body 12 as a turned part.

The invention claimed is:

1. A joint unit comprising:
a main body, the main body having a free axial end; and
a bush, which, in an assembled state of the joint unit, is fastened to the main body in the axial direction of a longitudinal axis of the joint unit and forms with the main body a receiving space that is located between the main body and the bush and open towards the free axial end of the main body, the receiving space being configured for receiving an external connecting piece not forming part of the joint unit, the bush comprising:
a retaining unit, the retaining unit being integrally formed as a single piece with the bush, and which, in the assembled state of the joint unit, has a portion that extends radially outward into the receiving space, the retaining unit comprising:
a first retaining element having:
a contact portion comprising a main web, a first connecting web, and a second connecting web, wherein the main web is curved concentrically relative to the longitudinal axis of the joint unit, wherein the main web extends in the circumferential direction over a predetermined angular range between a first end and a second end of the main web, wherein the main web has an outer surface and a radially inwardly directed surface that is opposite the outer surface, and wherein the main web is connected to the bush via the first connecting web and the second connecting web, respectively located adjacent the first end and the second end of the main web, wherein the first connecting web and the second connecting web each extend substantially in the axial direction of the longitudinal axis of the joint unit; and
a barb portion that extends from the outer surface of the main web, in a direction opposite the axial free end of the main body, to a free end of the barb portion, wherein the barb portion flares radially away from the outer surface of the main web, wherein a first bearing surface is formed at the free end of the barb portion, and wherein the first bearing surface is configured for interacting with a first mating bearing surface of the external connecting piece, and
the joint unit being configured for retaining the main body, the bush, and the external connecting piece in a non-detachable manner.

2. The joint unit according to claim 1, wherein the main body has a surface portion composed of a substantially cylindrical portion and a conically widening portion.

3. The joint unit according to claim 2, wherein the contact portion is configured and dimensioned such that, in the assembled state of the joint unit, substantially an entire surface of the contact portion is in contact with the outer circumferential surface of the main body.

4. The joint unit according to claim 3, wherein each of a first contact surface of the first connecting web and a second contact surface of the second connecting web comprises a first surface portion arranged concentrically with the longitudinal axis of the joint unit and a second surface portion that flares radially away from the first surface portion.

5. The joint unit according to claim 3, wherein the retaining unit comprises a second retaining element opposite the first retaining element.

6. The joint unit according to claim 5, wherein the first retaining element and the second retaining element both have an inner surface corresponding with the surface portion of the main body.

7. The joint unit according to claim 5, wherein the second retaining element has a second contact portion comprising a second main web, a third connecting web, and a fourth connecting web, wherein the second main web is curved concentrically relative to the longitudinal axis of the joint unit, wherein the second main web extends in the circumferential direction over a predetermined angular range between a third end and a fourth end of the second main web, wherein the second main web has an outer surface and a radially inwardly directed surface that is opposite the outer surface, and wherein the second main web is connected to the bush via the third connecting web and the fourth connecting web, respectively located adjacent the third end and the fourth end of the second main web, wherein the third connecting web and the fourth connecting web each extend substantially in the axial direction of the longitudinal axis of the joint unit.

8. The joint unit according to claim 2, wherein the main body comprises a circumferential groove located adjacent to the substantially cylindrical portion and configured for accommodating a sealing element for forming a seal between the main body and an external connecting piece received in the receiving space.

9. The joint unit according to claim 8, wherein the sealing element comprises an O-ring.

10. The joint unit according to claim 8, wherein, in the assembled state of the joint unit, the bush at most partially overlaps the circumferential groove.

11. The joint unit according to claim 8, wherein, in the assembled state of the joint unit, the bush at most partially overlaps the circumferential groove by an amount less than about 25% of the length of the circumferential groove in the axial direction.

12. The joint unit according to claim 1, wherein the bush has an outer circumferential surface that is closed over its entire circumference.

13. A joint assembly, comprising:
a connecting piece having a longitudinal axis and a first mating bearing surface; and
a joint unit, the joint unit comprising:
a main body, the main body having a free axial end; and
a bush, which, in an assembled state of the joint unit, is fastened to the main body in the axial direction of a longitudinal axis of the joint unit and forms with the main body a receiving space that is located between the main body and the bush and open towards the free axial end of the main body, the receiving space being configured for receiving the connecting piece in an assembled state of the joint assembly, the bush comprising:
a retaining unit, the retaining unit being integrally formed as a single piece with the bush, and which, in the assembled state of the joint unit, has a portion that extends radially outward into the receiving space, the retaining unit comprising:
a first retaining element having:
a contact portion configured to contact an outer surface of the main body, the contact portion comprising a main web, a first connecting web, and a second connecting web, wherein the main web is an arcuate structure extending from a first end to a second end, wherein the main web has an outer surface and a radially inwardly directed surface that is opposite the outer surface, and wherein the main web is connected to the bush via the first connecting web and the second connecting web, respectively located adjacent the first end and the second end of the main web; and a barb portion that extends from the outer surface of the main web, in a direction opposite the axial free end of the main body, to a free end of the barb portion, wherein the barb portion flares radially away from the outer surface of the main web wherein a first bearing surface is formed at the free end of the barb portion, and wherein the first bearing surface is configured for interacting with the first mating bearing surface of the connecting piece, and wherein, in the assembled state of the joint assembly, the joint unit is configured for retaining the main body, the bush, and the connecting piece in a non-detachable manner.

14. The joint assembly according to claim 13, wherein the connecting piece includes at least one window, wherein the first mating bearing surface of the connecting piece is formed by a defining face of the at least one window, the defining face extending orthogonally to the longitudinal axis of the joint assembly.

15. The joint assembly according to claim 13, wherein at least one radial projection is formed on one of the outer circumferential surface of the connecting piece and the inner circumferential surface of the bush, the at least one radial projection being configured to interact with a corresponding longitudinal groove formed in the other one of the inner circumferential surface of the bush and the outer circumferential surface of the connecting piece, to locate the bush relative to the connecting piece in the circumferential direction of the bush and the connecting piece.

16. The joint assembly according to claim 13, wherein the inner circumferential surface of the connecting piece comprises a first portion of larger diameter and a second portion of smaller diameter and wherein the portion of larger diameter and the second portion of smaller diameter are connected together via a conical portion.

17. The joint assembly according to claim 16, wherein the barb portion includes an outer surface and an inwardly directed surface that is opposite the outer surface of the barb portion and is spaced apart from the main web.

18. The joint assembly according to claim 16, further comprising a sealing element configured to be disposed between the connecting piece and the main body of the joint unit in the assembled state of the joint assembly, wherein the length of the first portion of larger diameter in a longitudinal direction of the connecting piece is dimensioned such that, in the assembled state of the joint assembly, the second portion of smaller diameter engages the sealing element, and the conical portion rests externally against the barb portion.

19. The joint assembly according to claim 13, wherein an entire outer circumferential surface of the bush is closed and, in the assembled state of the joint assembly, the bush is configured to prevent access to the retaining unit, and wherein, in the assembled state of the joint unit, a location of the bush is fixed in the axial direction of the main body.

20. The joint unit according to claim 13, wherein the retaining unit comprises a second retaining element opposite the first retaining element.

21. The joint unit according to claim 20, wherein the second retaining element has a second contact portion comprising a second main web, a third connecting web, and a fourth connecting web, wherein the second main web is curved concentrically relative to the longitudinal axis of the joint unit, wherein the second main web extends in the circumferential direction over a predetermined angular range between a third end and a fourth end of the second main web, wherein the second main web has an outer surface and a radially inwardly directed surface that is opposite the outer surface, and wherein the second main web is connected to the bush via the third connecting web and the fourth connecting web, respectively located adjacent the third end and the fourth end of the second main web wherein the third connecting web and the fourth connecting web each extend substantially in the axial direction of the longitudinal axis of the joint.

* * * * *